United States Patent [19]

Beler

[11] 4,266,823
[45] May 12, 1981

[54] CAMPER UNIT FOR USE WITH A DUMP TRUCK

[76] Inventor: Lloyd A. Beler, Box 57, Mankota, Saskatchewan, Canada, S0H 2W0

[21] Appl. No.: 77,094

[22] Filed: Sep. 19, 1979

[30] Foreign Application Priority Data

Oct. 18, 1978 [CA] Canada ................................. 313707

[51] Int. Cl.³ .............................................. B60P 3/42
[52] U.S. Cl. .................................................. 296/164
[58] Field of Search ............... 296/164, 165, 183, 184; 280/400

[56] References Cited

U.S. PATENT DOCUMENTS

| | | | |
|---|---|---|---|
| 3,817,545 | 6/1974 | Ward | 296/164 X |
| 4,019,781 | 4/1977 | Ray | 296/184 X |
| 4,054,301 | 10/1977 | Bond et al. | 296/184 X |
| 4,223,689 | 9/1980 | Cox | 296/164 X |

*Primary Examiner*—Randolph A. Reese
*Assistant Examiner*—Norman L. Stack, Jr.
*Attorney, Agent, or Firm*—Stanley G. Ade

[57] ABSTRACT

A camper unit for use with a dump truck includes a front portion normally resting on the floor of the dump truck with a rear portion extending down behind the tail gate area, but terminating clear of the ground. When it is desired to unload the camper, the dump truck body is elevated until the ground engaging means on the lower rear corners of the camper unit dig into the ground or frictionally engage the ground with part of the weight of the camper unit thereon. The truck is then driven slowly forwardly with the camper unit remaining stationary. Towards the front underside of the front portion of the camper unit, a hinged ground engaging support frame is mounted and when it clears the tail gate area of the truck body, it swings downwardly by gravity. The elevation of the dump truck body is adjusted as it is moved forwardly so that the support frame engages the ground thereby supporting the camper unit upon the support frame at the front and upon the rear portion of the camper at the rear. To load the camper, the dump truck body is elevated so that the floor engages under the front lower edge of the front portion of the camper and the truck is backed up towards the camper. This lifts the front end of the camper whereupon the dump truck body position is adjusted as the truck is backed under the camper, hinging the support frame rearwardly as it moves under the camper until the camper is fully loaded into the dump truck body. Means are provided to detachably lock the camper into the dump truck body.

5 Claims, 9 Drawing Figures

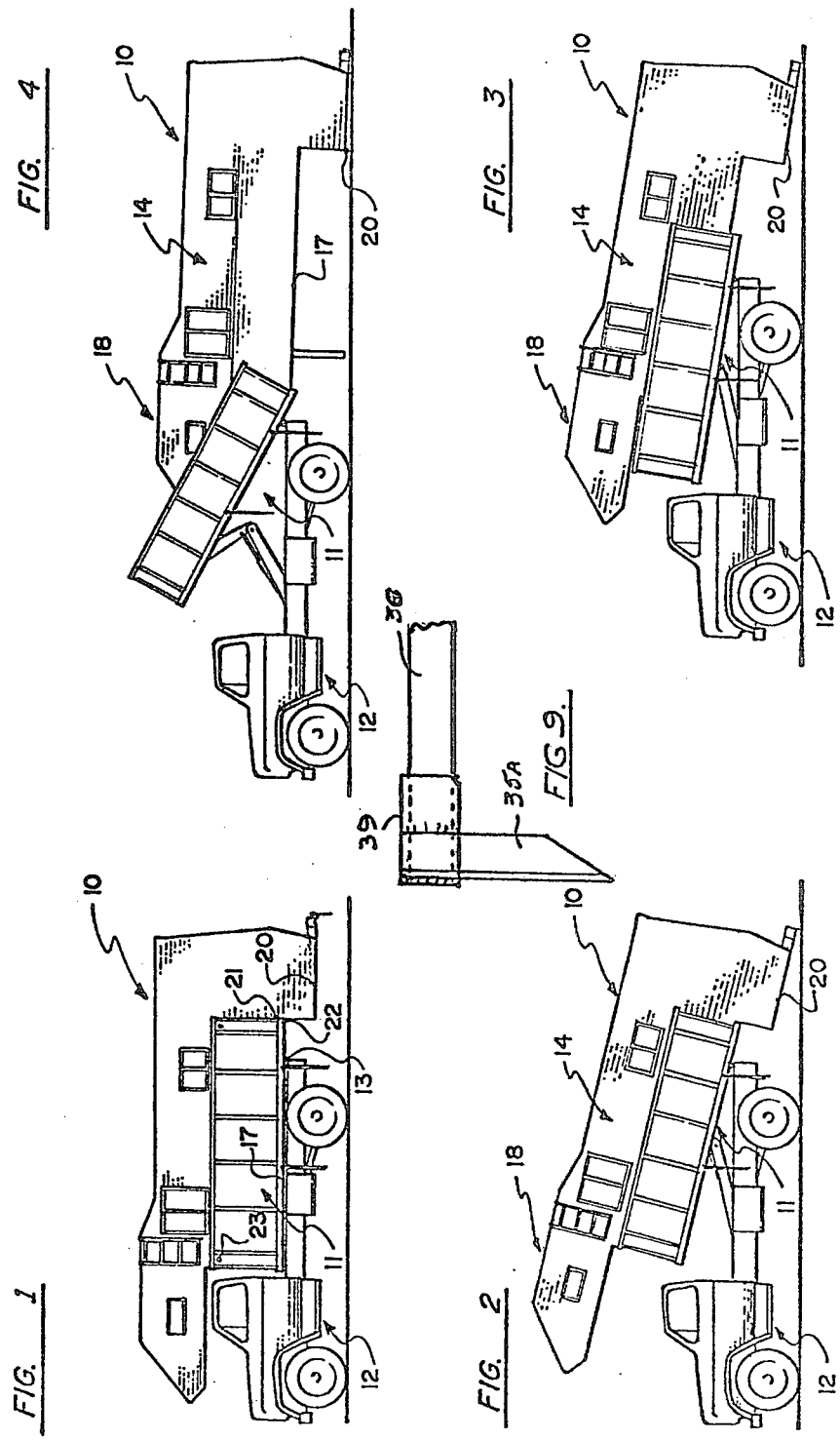

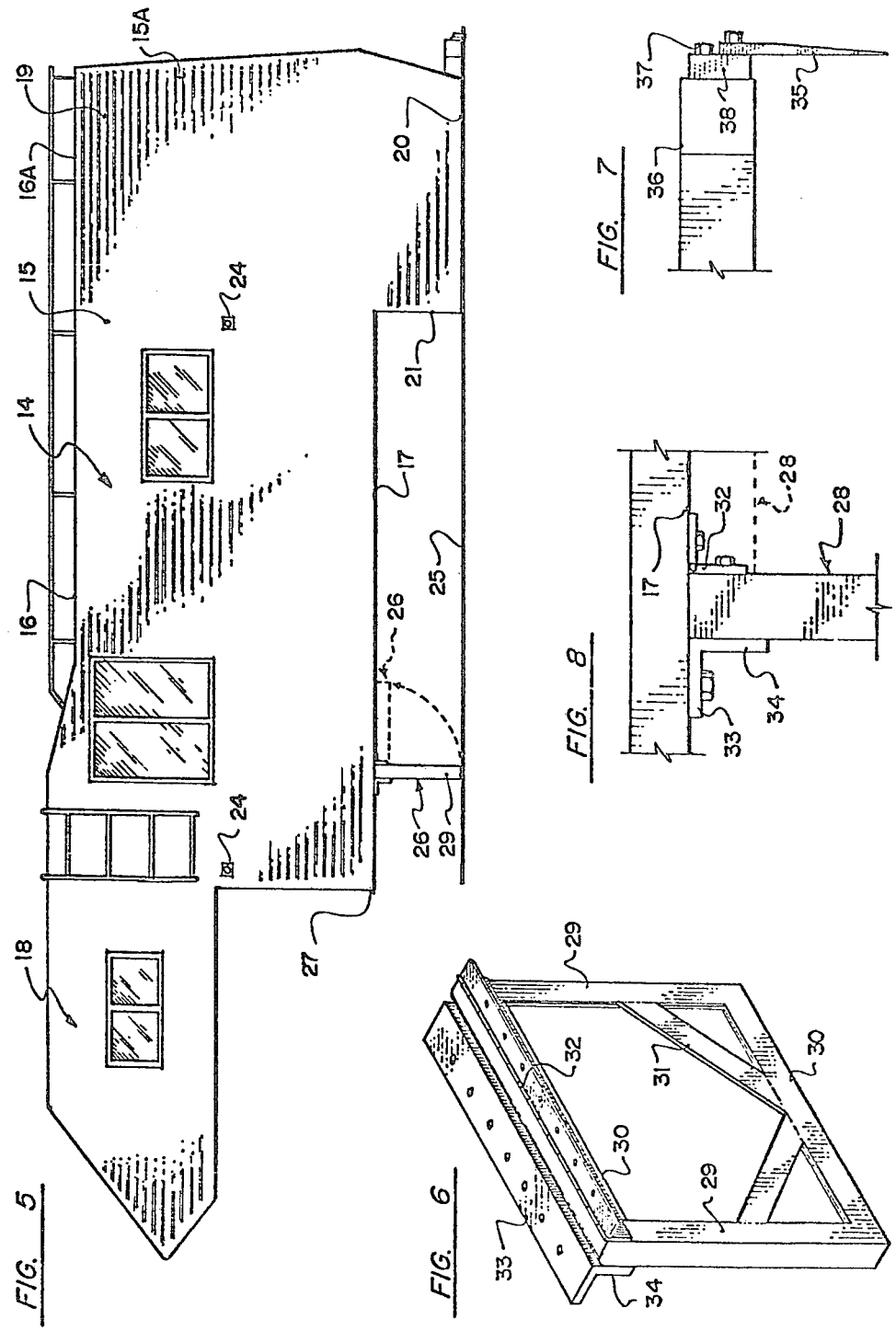

CAMPER UNIT FOR USE WITH A DUMP TRUCK

BACKGROUND OF THE INVENTION

This invention relates to new and useful improvements in camper units for trucks, particularly for dump trucks such as grain dump trucks and the like. Conventional camper units are provided for pick-up trucks and the like which are detachably mounted within the pick-up truck body. When it is desired to remove the camper unit from the pick-up truck, various jacking devices are utilized so that the weight of the trailer unit is released from the pick-up truck whereupon it is driven forwardly and forwardly positioned legs are then engaged adjacent each front corner and adjacent the rear of the trailer unit in order to support same in the desired position.

This is an extremely awkward manoeuver to undertake particularly as the trailer unit has to be jacked up into position and then left on relatively unsteady support means.

Furthermore, the average pick-up truck is relatively small so that the interior dimensions of such a trailer unit are limited.

SUMMARY OF THE INVENTION

The present invention overcomes these disadvantages by providing a camper unit specifically designed for use with dump truck bodies in which the dump truck body can be elevated and lowered around a transverse pivot point adjacent the rear of the chassis. Such dump trucks are usually sometimes larger than pick-up trucks so that this, together with the design of the camper unit, enables a camper unit of considerable dimensions to be provided.

One aspect of the invention is to provide a camper unit consisting of a major front portion having a planar base and a minor rear portion depending downwardly from the rear side of said front portion, and front support means hingedly secured to the underside of said front portion adjacent the front end thereof whereby said camper unit is supported upon the minor rear portion and upon said front support means when removed from the associated dump truck.

Another aspect of the invention is to provide a method of unloading a camper from a dump truck which includes a dump truck body having a floor therein, said body including means to elevate and lower same around a rear transverse pivot point, said camper unit including a front portion normally engaged upon the floor of the dump truck body and a rear portion depending downwardly of the rear of said dump truck body; comprising the steps of elevating the dump truck body until the rear transverse lower edge of the rear portion engages the ground, driving the truck forwardly and away from the camper unit, lowering a front portion support towards the ground, as the truck is moved forwardly, and adjusting the position of the elevation of said dump truck body as same is driven forwardly in order to engage the front portion support upon the ground.

A further advantage of the invention is to provide a method which consists of a further method of loading a camper unit upon the dump truck body, said further method including the steps of adjusting the inclination of the dump truck body so that the rear end of the floor thereof is slightly lower than the front lower edge of the camper unit, backing the truck rearwardly so that the floor of the dump truck body engages under the front lower edge of the camper unit, adjusting the angle of inclination of the dump truck body to lift the front end of the camper unit whereby the front portion support is lifted clear of the ground, and then further backing the truck under the camper unit and adjusting the angle of inclination of the dump truck body until the front portion of the camper unit is fully engaged upon the floor of the dump truck body and then returning the dump truck body to the lowermost position to lift the rear portion of the camper unit clear of the ground.

Still another advantage of the present invention is to provide a device of the character herewithin described in which the method of loading and unloading is relatively simple, and the structure associated therewith is economical and otherwise well suited to the purpose for which it is depicted.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE FIGURES

FIG. 1 is a schematic side elevation showing the camper unit fully loaded upon a dump truck.

FIG. 2 is similar to FIG. 1, but showing the first position in unloading the camper unit from the dump truck body.

FIG. 3 is similar to FIGS. 1 and 2, but showing the next step of unloading the camper unit from the dump truck body.

FIG. 4 shows the camper unit almost completely unloaded from the dump truck body.

FIG. 5 is a side elevation of the camper unit in the unloaded position.

FIG. 6 is an isometric view of the front support frame per se.

FIG. 7 is an enlarged fragmentary end view showing the ground engaging means at the rear of the camper unit.

FIG. 8 is a fragmentary enlarged end elevation showing the method of hinging the support frame to the underside of the camper unit.

FIG. 9 is a fragmentary rear elevation of an alternative construction of prong support on the rear bumper.

In the drawings like characters of reference indicate corresponding parts in the different figures.

DETAILED DESCRIPTION

Although FIGS. 1 to 4 show the steps of unloading the camper unit from the dump truck body, nevertheless it should be understood that the reverse situation i.e. FIGS. 4 through 1, are utilized to load the camper unit on the dump truck. Furthermore, only four positions are shown, nevertheless it will be appreciated that there are several intermediate steps between each of the figures as the process of unloading and loading is a continuous operation.

Proceeding therefore to describe the invention in detail, reference character 10 illustrates a camper unit and in FIG. 1, this camper unit is mounted within a dump truck body collectively designated 11 mounted upon a truck 12 and adapted to pivot around a transverse rear pivot illustrated schematically by reference character 13, adjacent the rear end of the truck chassis.

The camper unit consists of a major front portion 14 which is substantially comprised of side panels 15, a top panel 16, a substantially planar underside 17 and a forwardly extending cab-over portion collectively designated 18. The frame and body construction are conventional and it is therefore not believed necessary to show details thereof. The interior finish of the camper unit is also conventional and may take many forms.

Extending from the rear end of the major front portion 15, is a minor rear portion 19 in which the sides 15A are extensions of the sides 15, and the roof 16A is an extension of the roof 16. However, the side panels 15A extend downwardly below the planar floor 17 of the front portion and terminates spaced from the ground, when in the position shown in FIGS. 1 and 5, and this rear floor portion is indicated by reference character 20.

The intermediate wall 21 extending between the rear edge of the front portion floor 17 and the rear portion floor 20, is substantially vertical and, when in position upon the dump truck body, is adjacent the rear transverse edge 22 of the truck body floor.

When engaged within the truck body as shown in FIG. 1, practically the entire planar floor 17 of the major front portion 14, is engaged upon the truck body floor.

When in this position, means are provided to detachably secure the camper unit within the truck body, said means taking any convenient form. In the present instance, bolts 23 are shown extending through the sides of the truck body and into screw threaded receptacles 24 situated on the two sides of the major portion of the camper unit. However, clamps may be used similar to those used to detachably secure camper unit to pick-up truck. The design of such detachable securement means being a matter of choice and depending upon design parameters.

When in the unloaded position shown in FIG. 5, the camper unit is supported at the rear by the floor 20 of the minor rear portion 19 engaging the ground surface 25. The front of the camper unit is supported by means collectively designated 26 which extend downwardly from the floor 17 adjacent the lower front corner 27 of the camper unit.

In this embodiment, means 26 take the form of a support frame collectively designated 28 comprising a substantially rectangular frame formed from vertical channel members 29 and horizontal channel members 30 welded or otherwise secured together and braced by diagonal members 31.

This frame is hinged to the underside of the floor 17 adjacent the front corner 27 thereof by means of a transverse hinge assembly 32, one flange of which is secured to the frame 28 and the other flange of which is secured transversely across the underside of the floor and this hinge is positioned so that the frame may move from a substantially vertical ground engaging position shown in FIG. 5, to a substantially horizontal position in juxtaposition with the underside of the floor as shown in phantom in FIG. 5.

Stop means are provided to limit the downward movement of the frame 28, and in this embodiment said stop means take the form of an angle iron 33 secured across the floor with the vertical flange 34 thereof being engaged by the portion of the frame as it swings to the downwardly vertical position.

Means are also provided adjacent the rear of the minor portion 19 of the camper unit, to engage the ground during the loading and unloading sequence as will hereinafter be described, said means taking the form of ground engaging spikes 35 or the like secured to the rear bumper 36 by means of bolts 37 and brackets 38.

In operation, and assuming that the camper unit is loaded upon the dump truck body as shown in FIG. 1, the securement means are detached to release the camper unit from the dump truck body.

Next, the dump truck body is elevated slightly until the ground engaging prongs 35 engage the ground to anchor the camper unit in this position, assisted by the portion of the weight of the camper unit pressing upon the prongs 35 when the dump truck body is partially elevated. The dump truck 12 is then driven forward slowly withdrawing the dump truck body from the camper unit until the support frame 26 clears the rear transverse edge 22 of the dump truck floor whereupon it swings downwardly by gravity.

The position of the dump truck body is then adjusted so that this support frame engages the ground whereupon the dump truck can be driven clear of the camper unit so that it is supported upon the frame 26 of the front and upon the underside of the rear portion 19 at the rear as illustrated in FIG. 5.

Forward or rearward movement of the camper unit relative to the ground is prevented by the frictional engagement of the floor 20 of the rear portion with the ground and due to the transversely extending support frame 26, the camper unit is fully stable in this position.

In order to load the camper unit upon the dump truck, the dump truck body is raised until the rear edge 22 of the floor is slightly lower than the front transverse edge 27 of the front portion of the camper unit whereupon the truck is backed up to the camper unit until the corner 27 is engaged by the floor of the dump truck body. This inclination of the dump truck body is then adjusted sufficiently to raise the support frame 26 clear of the ground whereupon the truck is backed up and the angle of inclination of the dump truck body is adjusted so that the camper unit slides onto the floor of the dump truck unit to the position shown in FIG. 2. The dump truck body is then lowered lifting the rear end of the camper unit clear of the ground so that it takes up the position shown in FIG. 1.

It will therefore be seen that not only does this invention provide an efficient and relatively large camper unit for use upon a dump truck body, but also provides a method for loading and unloading same from the dump truck body readily and easily.

Referring back to the frame 26, this is preferably situated between the floor joists (not illustrated) so that, when folded upwardly, it would be recessed in the under side and be hidden completely thus presenting a smooth underside 17 to facilitate engaging and disengaging the camper unit with the truck.

In conclusion, reference should be made to FIG. 9 which shows an altenative and preferred construction for the ground engaging prongs 35A.

The prong is preferably manufactured from a length of angle iron or the like and cut back to form the pointed end. This is then welded to a relatively short length of square tubing 39, the inside dimensions of which are such that the length of tubing fits tightly over the ends of the square bumper 36 and is held frictionally or by welding or the like.

Since various modifications can be made in my invention as hereinabove described, and many apparently widely different embodiments of same made within the spirit and scope of the claims without departing from such spirit and scope, it is intended that all matter contained in the accompanhing specification shall be interpreted as illustrative only and not in a limiting sense.

What I claim as my invention is:

1. A camper unit for detachable engagement upon a dump truck body which includes means to tip said body rearwardly at an angle to the horizontal and to return same to the normal horizontal position; comprising in combination a camper body and frame construction including a major front portion having a planar base and a minor rear portion depending downwardly from the rear side of said front portion, said body and frame being supported on the dump truck body by said planar base, and front support means hingedly secured to the underside of said front portion adjacent the front end thereof whereby said camper unit is supported upon the minor rear portion and upon said front support means when removed from the associated dump truck, said front support means including a frame hinged by the upper end thereof to the underside of said front portion and extending transversely thereacross, to hinge upwardly and reardly to a substantially horizontal stored position between said major portion and said dump truck body and downwardly and forwardly to a ground engaging position, and stop means to limit the downward and forward movement of said frame, said frame automatically hinging downwardly and forwardly by gravity to said stop means when said camper unit is removed from the dump truck body sufficiently for said frame to clear said dump truck body.

2. The camper unit for use with a dump truck body comprising in combination a dump truck body engaging front portion and a rear portion depending downwardly from the rear side of said front portion, the underside of said portions being substantially planar, the junction between said undersides extending downwardly from the rear edge of the underside of said front portion at approximately 90° and joining the front edge of the underside of said rear portion also at approximately 90°, and front support means hingedly secured to the underside of said front portion adjacent the front end thereof whereby said camper unit is supported upon the rear portion and said front support means when removed from the associated dump truck, said front support means including a frame hinged by the upper end thereof to the underside of said front portion and extending transversely thereacross, to hinge upwardly and rearwardly to a substantially horizontal stored position between said major portion and said dump truck body and downwardly and forwardly to a ground engaging position, and stop means to limit the downward and forward movement of said frame, said frame automatically hinging downwardly and forwardly by gravity to said stop means when said camper unit is removed from the dump truck body sufficiently for said frame to clear said dump truck body.

3. The camper unit according to claims 1 or 2 which includes means depending downwardly from the rear lower edge of said rear portion frictionally engaging the ground when loading and unloading said camper unit from the associated dump truck.

4. A method of unloading a camper unit from a dump truck which includes a dump truck body having a floor therein, said body including means to elevate and lower same around a rear transverse pivot point, said camper unit including a front portion normally engaged upon the floor of the dump truck body and a rear portion depending downwardly of the rear of said dump truck body clear of the ground; comprising the steps of elevating the dump truck body until the rear transverse lower edge of the rear portion engages the ground, driving the truck forwardly and away from the camper unit, automatically lowering a front portion support towards the ground by gravity, as the truck is moved forwardly, and adjusting the position of the elevation of said dump truck body as same is driven forwardly in order to engage the front portion support upon the ground.

5. The method according to claim 4 which includes a further method of loading a camper unit upon the dump truck body, said further method including the steps of adjusting the inclination of the dump truck body so that the rear end of the floor thereof is slightly lower than the front lower edge of the camper unit, backing the truck rearwardly so that the floor of the dump truck body engages under the front lower edge of the camper unit, adjusting the angle of inclination of the dump truck body to lift the front end of the camper unit whereby the front portion support is lifted clear of the ground, and then further backing the truck under the camper unit and adjusting the angle of inclination of the dump truck body until the front portion of the camper unit is fully engaged upon the floor of the dump truck body and then returning the dump truck body to the lowermost position to lift the rear portion of the camper unit clear of the ground.

* * * * *